United States Patent [19]

Möller

[11] 4,382,723

[45] May 10, 1983

[54] SILO FOR STORAGE OF POWDER-LIKE COMMODITIES

[75] Inventor: Hermann Möller, Hamburg, Fed. Rep. of Germany

[73] Assignee: Fa. Johannes Möller Hamburg GmbH & Co. KG, Hamburg, Fed. Rep. of Germany

[21] Appl. No.: 244,960

[22] Filed: Mar. 18, 1981

[30] Foreign Application Priority Data

Mar. 19, 1980 [DE] Fed. Rep. of Germany ....... 3010499

[51] Int. Cl.[3] ........................ B65G 65/00; B65G 53/40

[52] U.S. Cl. ...................................... 406/90; 406/137; 406/136; 222/195; 222/564

[58] Field of Search .................... 406/91, 90, 138, 146, 406/136, 137; 222/195, 564, 630, 637

[56] References Cited

U.S. PATENT DOCUMENTS 3,793,742 2/1974 Rainville et al. .................... 222/195

4,061,246 12/1977 Miksitz ................................ 222/564

FOREIGN PATENT DOCUMENTS 2210335 10/1972 Fed. Rep. of Germany ...... 222/564

2400996 7/1974 Fed. Rep. of Germany ...... 222/195

*Primary Examiner*—John J. Love

*Assistant Examiner*—L. E. Williams

*Attorney, Agent, or Firm*—Michael J. Striker

[57] ABSTRACT

A silo for storage and homogenization of powder-like commodities includes a housing with a peripheral wall defining an interior chamber in which a cone facilitating the flowing movement of the commodity is located. The cone has an apex formed with a ventilation opening which is surrounded by an aerating device to which air is supplied. A bottom wall arranged within the housing has an outlet for discharging the commodity from the silo and is provided with pneumatic chutes sloped towards the outlet. A number of sector-like ventilation elements are mounted on the bottom wall which are adapted to admit air to the silo which air rises through the interior of the cone, passes through the ventilation opening and enters the commodity located above the cone.

24 Claims, 6 Drawing Figures

SILO FOR STORAGE OF POWDER-LIKE COMMODITIES

BACKGROUND OF THE INVENTION

The present invention relates to a silo for storage and homogenization of powder-like materials, such as flour.

Powder-like commodities are often stored in silos of substantial size. The construction of such silos is known in the art. The known silos include an inlet for entry of the commodity into the silo and an outlet for discharge of the material from the silo to a user site. In order to facilitate the movement of the flowing material towards the outlet the silos may be provided with a cone located within the silo and upwardly spaced from the central outlet zone.

Cones of different structures are utilized in these silos. These cones, however, have certain disadvantages.

If the underside of the cone is closed the interior of the cone can not be used for storage of commodities contained in the silo. In case the underside of the cone is at least partially open, for example by arranging of a passage through said underside, the interior of the cone is available for storage of the powder-like material. In such case the silo is provided with a device for injecting air into the silo content and with a conduit for withdrawing air to provide aeration of the material contained in the silo.

The German Pat. Nos. 1,507,888 and 2,121,616 disclose the silo constructions where aerated air is withdrawn through a central ventilation tube which extends from the apex of the cone to the roof of the silo. In such constructions the forces exerted in the flowing material contained in the silo are incalculable in their magnitude and direction of action.

In the silos described in the German Pat. No. 2,539,753 the ventilation tube is mounted in the region of the peripheral wall of the silo. This structure requires a tunnel between the cone and the peripheral wall, which tunnel extends to the apex of the cone.

In the silo disclosed in the German published patent application No. 2,040,480, a discharging ventilation tube is arranged beneath the cone which is closed from above. This tube extends downwardly through the bottom wall of the silo and terminated in the area of a conveying device. In such construction, a significantly high portion of the commodity entering the conveying device remains uncontrolled.

The German Pat. Nos. 2,352,455 and 2,547,667 describe the silo arrangement where the interior of the cone is not used for storage of the commodity. The lower rim of this cone is provided with a discharging dosing passage through which the folowing material is discharged. However, in this case only a portion of the commodity flows through this passage, the remaining portion flows through individual outlets located outside of the cone.

SUMMARY OF THE INVENTION

It is an object of the invention to provide an improved silo construction.

Another object of the invention is to provide a device which avoids by simple means the aforementioned shortcomings encountered in the prior art.

A further object of the invention is to optimally utilize the interior volume of the silo for storage and homogenization of the commodity contained therein.

A still further object of the invention is to provide a silo construction of significantly decreased costs.

These and other objects of the invention are attained by a silo for storage and homogenization of powder-like commodities, such as flour, comprising a housing defining a chamber and having an outlet, inlet means for receiving the commodity into said housing, means communicating with said outlet for discharging the commodity from said housing, a bottom wall inclined downwardly towards said outlet, a hollow cone positioned in said housing and upwardly spaced from said bottom wall and having an open underside and an apex formed with a ventilation opening communicating with said chamber, means for admitting air in upward direction into the commodity beneath said cone so that the air rises therein and escapes through said ventilation opening, and aerating means surrounding said ventilation opening for aerating the commodity in said chamber in the region about said ventilation opening.

The ventilation opening may be conical with a cone tapering towards said outlet.

The aerating means may be defined by an outer wall which is circumferentially spaced from the ventilation opening.

The outer wall may be cylindrical or conical.

The apex of the cone may be provided with an upper surface, the aerating means being positioned on said upper surface.

The silo may include means for supporting the cone within the housing, which means include a plurality of supporting bars connected to the cone.

The discharging means may include a plurality of pneumatic chutes extending radially towards said outlet and circumferentially spaced from one another.

The cone may include an outer rim on the underside thereof, said rim being spaced from the bottom wall of the housing to define an annular gap therebetween.

The air admitting means may include a plurality of ventilating elements located beneath the cone and circumferentially spaced from one another.

The ventilating elements may be formed as sectors and include two adjacent surfaces inclined relative to each other, said surfaces sloping downwardly towards said outlet.

The bottom wall may have an upper surface, the pneumatic chutes and the ventilating elements extending along said surface and occupying at least 80% of said surface.

The housing of the silo may be bounded by an elongated cylindrical wall and the supporting bars may extend along the axis of the elongation of the housing, or alternatively, at an angle relative thereto. In the latter case the bars are inclined in a direction of tapering of the cone.

The outlet may be positioned in the bottom wall, centrally relative to the peripheral wall of the housing, or it may be mounted in the peripheral wall laterally of the central outlet zone.

The ventilating elements in the silo may be supplied by air independently from one another and at various periods of time.

A number of silos containing different commodities may be provided which are connected to a mixing silo.

In the silo construction according to the invention the air or ventilation opening is immediately connected to the aerating means so that the commodity located in the silo above the ventilation opening is aerated because the aerating air collected in the bottom zone below the cone is able to flow towards the apex of the cone and then through the ventilation opening thereby aerating the commodity above the cone.

In the arrangement provided by the proposed invention the tube conduit extended between the apex of the cone and the roof of the silo is no longer required. Additionally, the discharge of the flowing material is significantly improved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
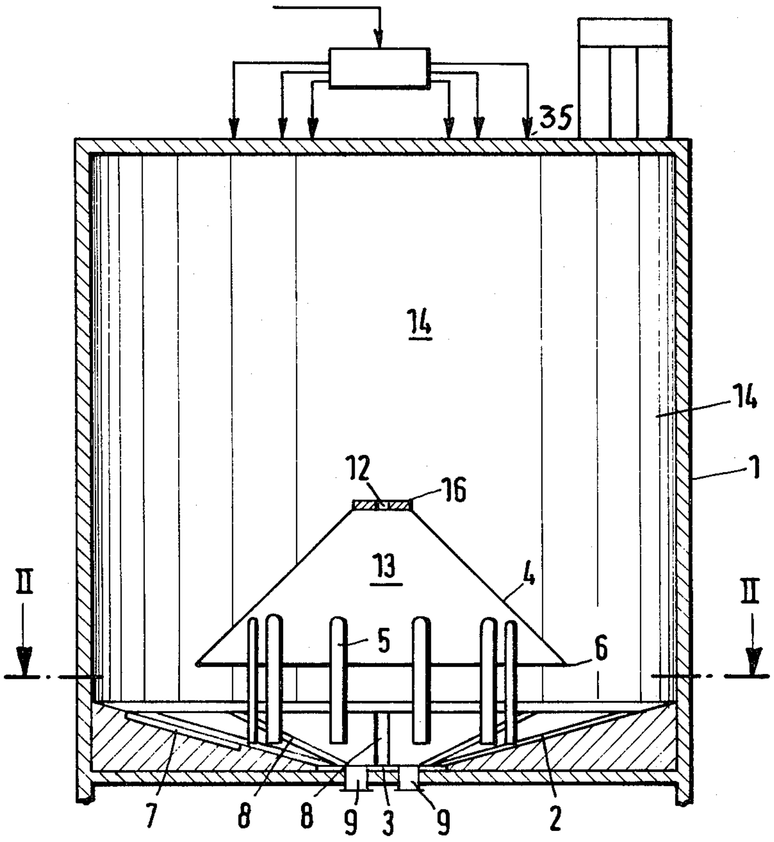
FIG. 1 is an axial sectional view of a silo in accordance with a first embodiment of the invention.
Figure 2:
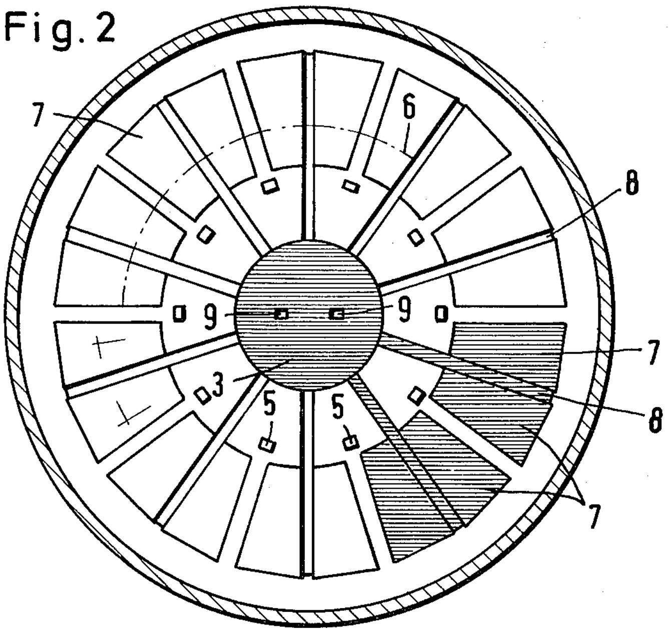
FIG. 2 is a sectional view along line II—II of FIG. 1.

Referring to FIGS. 1 and 2, a silo of the invention includes a housing generally designated as 1 which defines an inner chamber 14 into which a commodity, such as flour, is fed through inlets 32. The housing 1 is formed by an outer wall of a circular cross-section and is provided with a bottom wall 2 having an outlet zone 3. The bottom wall 2 is sloped towards the outlet zone to facilitate the discharging of the silo content from the chamber 14. A central cone 4 is positioned within the housing 1, the cone 4 being supported by a plurality of supporting bars 5 circumferentially spaced from one another. Ten supporting bars 5 are shown in the drawing. The cone 4 has an open underside which is terminated with an outer rim 6. A number of ventilating elements 7 positioned in the form of the enclosed ring are located beneath the outer rim 6. This enclosed ring is subdivided into a plurality of sectors each of which constitutes the ventilating element 7. The sectors 7 are circumferentially spaced from each other and may be individually and independently from one another supplied by air.

Each sector 7 includes two adjacent surfaces inclined towards each other and sloping towards the center of the bottom wall 2 in a downward direction. A plurality of pneumatic conveying chutes 8 connected to the outlet zone 3 are provided in the silo for directing the commodity towards outlet openings 9 formed in the outlet zone 3. The conveying chutes 8 are also inclined towards the outlet zone 3 as well as the ventilating elements 7.

As shown in FIG. 2, the supporting bars 5 are positioned between the respective ventilating elements 7 or intermediate of two successive conveying chutes 8 so that proper discharging of the commodity from the silo is not prevented. For this purpose the supporting bars 5 are positioned along the circumference whose diameter is substantially smaller than the outer diameter of the rim 6 of the cone. Outwardly of the supporting bars 5, there is located a circular zone which is partially occupied by the ventilation elements 7 and chutes 8. The elements 7 and 8 occupy approximately 80% of the upper surface of the bottom wall 2. The annular gap or distance between the outer rim 6 of the cone 4 and the bottom wall 2 substantially corresponds to the distance between the rim 6 and the inner wall of the silo in a transverse direction. In the foregoing structure the maximal outer diameter of the cone 4 is not significantly smaller than the inner diameter of the housing 1. For example, in the structure where the inner diameter of the silo is 20 m, the maximum outer diameter of the cone is equal to somewhat 16 m whereas the distances between the cone and the inner wall of the silo in a lateral direction are approximately equal to 2 m.

The cone 4 is formed with a ventilation opening 12 arranged in communication with an interior chamber 13 of the cone 4 and with the inner chamber 14 of the housing 1. This provides for a direct communication between the interior of the cone and the silo content located in the chamber 14. Due to such arrangement the air shown by an arrow 15 in FIG. 4 can flow from the interior of the cone 4 upwardly to the chamber 14 of the silo.

The ventilation opening or channel 12 has a downwardly narrowing configuration and is surrounded by an aerating device 16. The aerating device 16 shown in FIGS. 3 and 4 includes an element 17 having an annular chamber 18.

Figure 3:
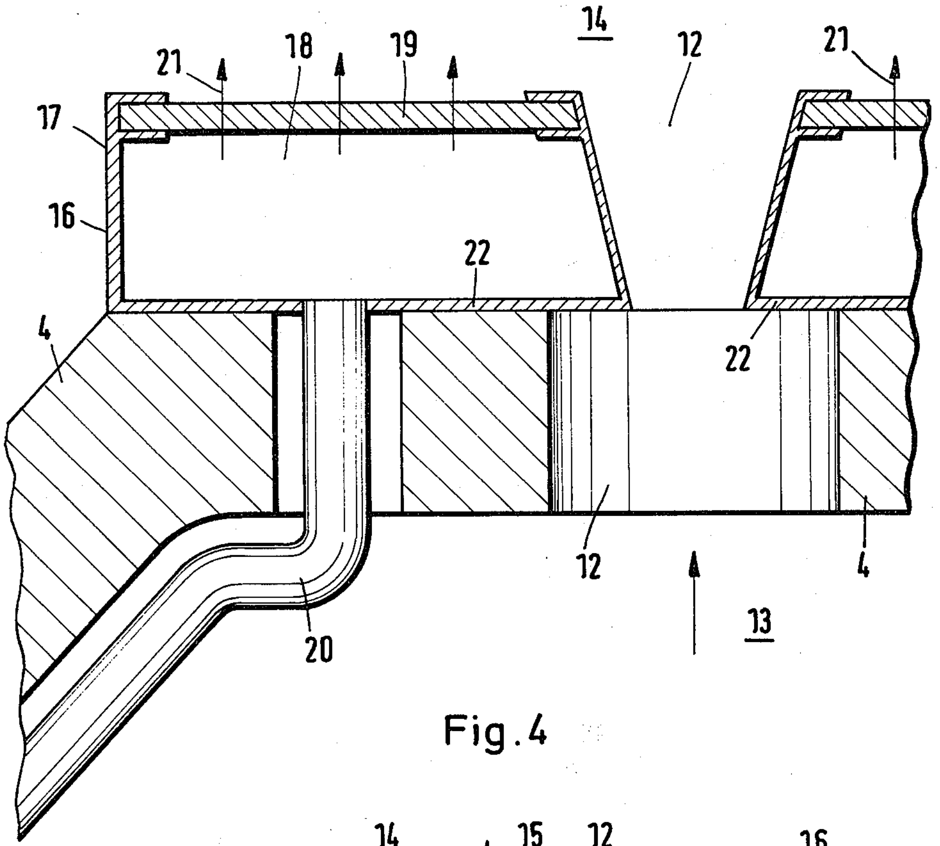
FIG. 3 is an enlarged partial view of an aerating device according to the invention.

In the embodiment shown in FIG. 3, the upper sides 19 of the element 17 are made of porous fabric through which aerating air discharged from a conduit 20 enters the chamber 14 as shown by arrows 21. The commodity contained in the chamber 14 is aerated and the air from the chamber 13 of the cone 4 can enter the chamber 14.

Figure 4:
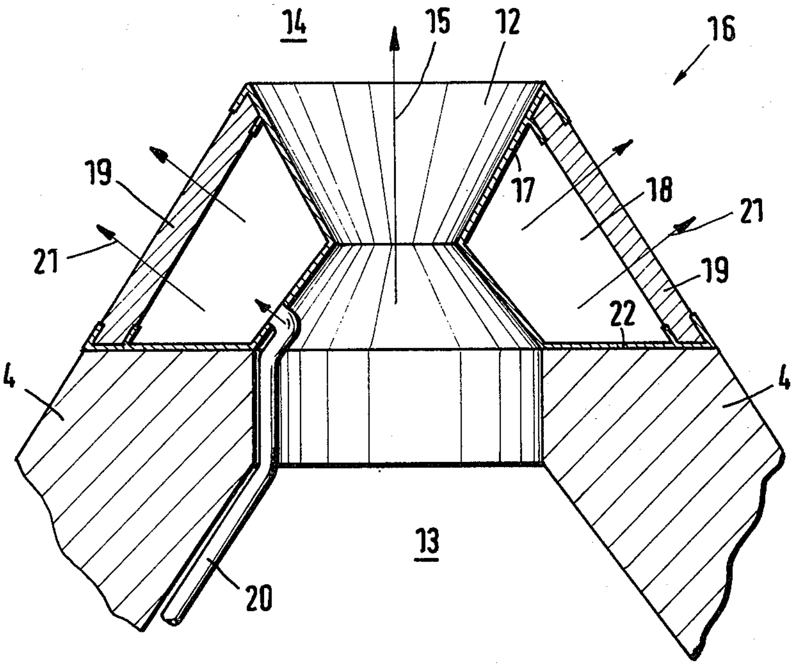
FIG. 4 shows a modification of the aerating device according to the invention.

In the embodiment illustrated in FIG. 4, the annular chamber 18 is bounded by a conical outer wall 19 which is formed of porous fabric. The aerating element 17 surrounds the air opening 12 and is positioned on the upper face 22 of the apex of the cone 4.

Figure 5:
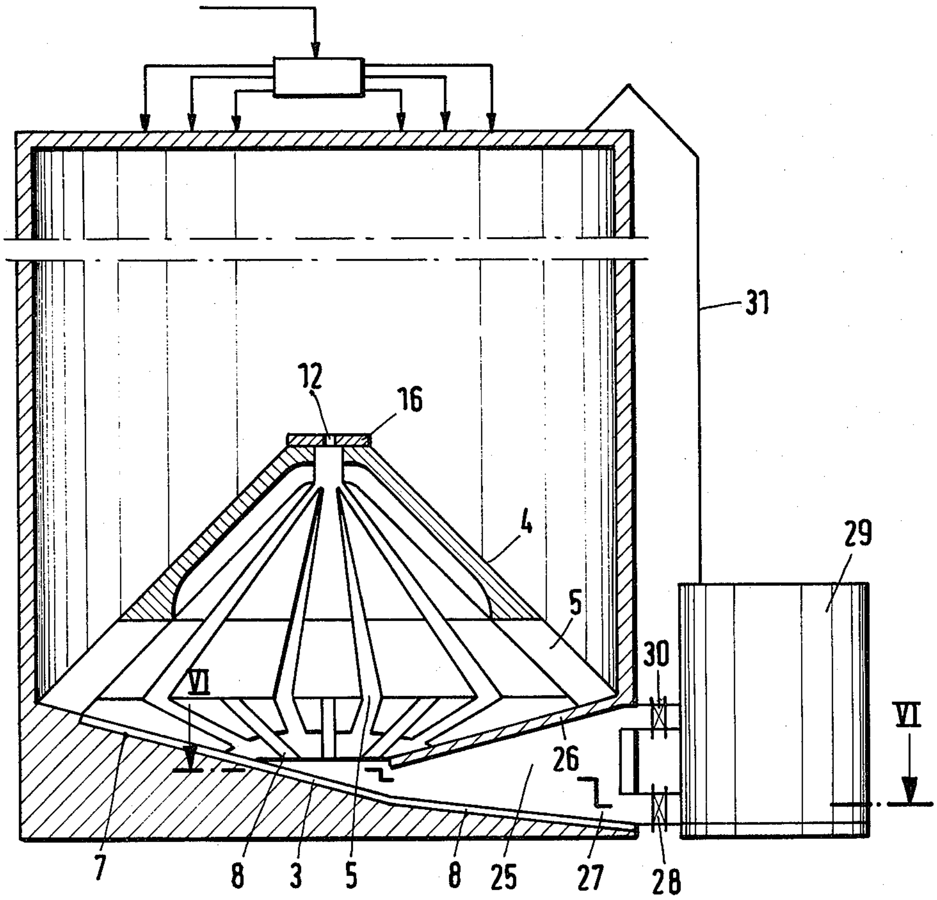
FIG. 5 is an axial sectional view of a silo in accordance with another embodiment of the invention.

FIG. 5 illustrates still another embodiment of the invention where the cone 4 is positioned within the silo. The cone 4 is supported within the housing 1 by means of supporting bars 5 spaced uniformly along the circumference of the cone 4. The supporting bars 5 are tapered in the same direction as the cone 4 and surround the cone so that they extend to the inner wall of the housing 1. In such structure, forces exerted in the flowing powder-like material can be transmitted immediately to the wall of the housing. In this embodiment the lower ends of the supporting bars 5 terminate in the areas between the conveying chutes 8 but outside of the region where the ventilation elements 7 are located.

In accordance with a further embodiment of the invention a number of silos containing different commodities may be provided, each communicating with a mixing silo 29.

Figure 6:
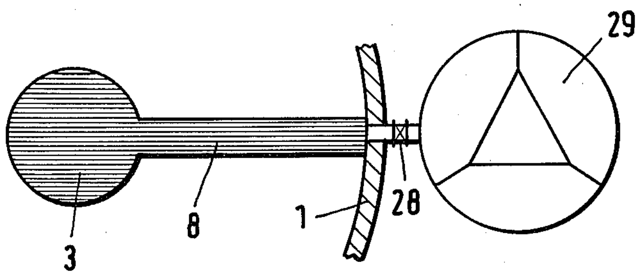
FIG. 6 is a partial sectional view along line VI—VI of FIG. 5.

In the embodiment shown in FIGS. 5 and 6, the central outlet zone 3 is inclined towards a tunnel 25 which connects the outlet zone with an outlet formed in this embodiment at the lateral side of the housing 1. The tunnel 25 is enclosed by a wall portion 26. The commodity discharged from the silo is fed into the outlet 27 provided with a valve 28. The commodity is discharged from the silo directly through the valve 28. Valve 28 is connected to the mixing silo 29. It is to be understood that only one silo connected to the mixing silo 29 is shown in FIG. 5.

The aerating air fed into the tunnel 25 through the ventilation elements 7 flows then to a valve 30 and by means of a conduit 31 returns to the chamber 14 of the housing 1. The conduit 31 may pass through the mixing silo 29. In the structure with a number of silos connected to the mixing silo 29 it is preferable that throttling devices 28 and 30 will be positioned between the distinct silos.

It will be understood that each of the elements described above, or two or more together, may also find a useful application in other types of silos differing from the types described above.

While the invention has been illustrated and described as embodied in a silos, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set fourth in the appended claims:

1. A silo for storage and homogenization of powder-like commodities, such as flour, comprising a housing defining a chamber and having an outlet; inlet means for receiving the commodity into said housing; means communicating with said outlet for discharging the commodity from said housing; a bottom wall inclined downwardly towards said outlet; a hollow cone positioned in said housing and upwardly spaced from said bottom wall and having an open underside and an apex formed with a ventilation opening communicating with said chamber; means for admitting air in upward direction into the commodity beneath said cone, so that the air rises therein and escapes through said ventilation opening; and aerating means surrounding said ventilation opening for aerating the commodity in said chamber in the region about said ventilation opening.

2. The silo of claim 1, wherein said ventilation opening is conical with a cone tapering towards said outlet.

3. The silo at claim 2, wherein said aerating means is defined by an outer wall, said outer wall being circumferentially spaced from said ventilation opening.

4. The silo of claim 3, wherein said outer wall is cylindrical.

5. The silo of claim 3, wherein said outer wall is conical.

6. The silo of claim 3, wherein said apex of said cone is provided with an upper surface, said aerating means being positioned on said upper surface.

7. The silo of claim 6, further including means for supporting said cone within said housing.

8. The silo of claim 7, wherein said cone includes an outer rim on said underside thereof, said rim being spaced from said bottom wall to define an annular gap therebetween.

9. The silo of claim 8, wherein said discharging means include a plurality of pneumatic chutes extending radially towards said outlet and circumferentially spaced from one another.

10. The silo of claim 9, wherein said air admitting means include a plurality of ventilating elements located beneath said cone and circumferentially spaced from one another.

11. The silo of claim 10, wherein said supporting means include a plurality of supporting bars connected to said cone.

12. The silo of claim 11, wherein said supporting bars are spaced in a circumferential direction and located between the successively positioned pneumatic chutes.

13. The silo of claim 11, wherein each of said ventilating elements has a sector-like shape and includes two adjacent surfaces inclined relative to each other, said surfaces sloping downwardly towards said outlet.

14. The silo of claim 13, wherein said bottom wall has an upper surface, said pneumatic chutes and said ventilating elements extending along said surface and occupying at least 80% of said surface.

15. The silo of claim 11, wherein said housing is bounded by an enlongated peripheral wall.

16. The silo of claim 15, wherein said supporting bars extend parallel the axis of elongation of said housing.

17. The silo of claim 15, wherein said supporting bars are inclined in a direction of tapering of said cone.

18. The silo of claim 17, wherein said supporting bars are supported outside of said upper surface of said bottom wall.

19. The silo of claim 18, wherein the clearance between said outer rim of said cone and said peripheral wall of said housing substantially corresponds to the distance between said rim and said bottom wall.

20. The silo of claim 16, wherein said outlet is positioned in said bottom wall and centrally relative to said peripheral wall.

21. The silo of claim 19, further including a tunnel interpositioned between said discharging means and said outlet, said outlet being located in said peripheral wall.

22. The silo of claim 21, including a sloped internal wall, said tunnel extending transversely of said peripheral wall and being defined by said bottom wall and said sloped internal wall.

23. The silo of claim 22, further including additional silos and a mixing silo, said tunnel being connected to said mixing silo.

24. The silo of claim 11, wherein said ventilating elements are supplied by air independently from one another and for different periods of time.

* * * * *